US006474734B1

United States Patent
Masuda et al.

(10) Patent No.: US 6,474,734 B1
(45) Date of Patent: Nov. 5, 2002

(54) EMERGENCY LOCKING SEAT HINGE DEVICE AND VEHICLE SEAT USING THE SAME

(75) Inventors: Kou Masuda, Yokohama (JP); Takeshi Nakamura, Yokohama (JP); Osamu Ohki, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/598,233

(22) Filed: Jun. 21, 2000

(30) Foreign Application Priority Data

Jun. 24, 1999 (JP) ............................................. 11-179045

(51) Int. Cl.[7] .................................................. B60N 2/42
(52) U.S. Cl. .................................. 297/216.13; 297/366
(58) Field of Search ........................ 297/216.1, 216.13, 297/374, 366; 16/221, 354

(56) References Cited

U.S. PATENT DOCUMENTS 5,593,210 A * 1/1997 Schwarzbich
6,032,777 A * 3/2000 Denis

FOREIGN PATENT DOCUMENTS

JP    10234507    9/1998

* cited by examiner

Primary Examiner—Milton Nelson, Jr.
(74) Attorney, Agent, or Firm—Marshall & Melhorn, LLC (57) ABSTRACT

An emergency locking seat hinge device includes an inner and outer members defining a plurality of chambers therebetween, each having a relatively wide central part and end parts which get progressively narrower circumferentially away from the central part, a rolling member received in each of the chambers, a resiliently supported retaining member which retains each of the rolling members in the side central part of the corresponding chamber, and an acceleration sensitive locking device which actuates the retaining member so as to cause the rolling members to wedge between the inner and outer members. Because this seat hinge device permits free rotation under normal condition but prevents the relative rotation in a high acceleration situation, it can effectively increase the mechanical strength and rigidity of a seat back against tilting particularly when it is used on one side of a vehicle seat while a normal recliner hinge device is used on the other side of the vehicle seat.

14 Claims, 8 Drawing Sheets

EMERGENCY LOCKING SEAT HINGE DEVICE AND VEHICLE SEAT USING THE SAME

TECHNICAL FIELD

The present invention relates to a seat hinge device which freely permits angular movement of a seat back relative to a seat bottom under normal circumstances but prevents the angular movement in case of an emergency. The present invention also relates to a vehicle seat using such an emergency locking seat hinge device

BACKGROUND OF THE INVENTION

A vehicle seat is often provided with a seat hinge device for permitting an angular movement of a seat back relative to a seat bottom. typically for permitting the adjustment of the angle of the seat back for the best comfort of the vehicle occupant. Japanese patent laid open publication No. 10-234507 discloses a seat hinge device of this type which permits an angular adjustment of the seat back in a continuous manner as opposed to the more conventional ratchet gear type adjustment mechanism which is capable of angular adjustment only in a discrete manner. Also, the seat back may be required to be folded forward to permit access to the rear compartment of the vehicle, and a seat hinge device may be used for such a purpose. In either case, a locking mechanism or a latch mechanism is provided in association with the hinge device to fixedly secure the angular position of the seat back under normal conditions, and to selectively permit free angular motion of the scat back when so desired. Typically, such a hinge device is provided only on one side of the seat while the other side of the seat is provided with a normal hinge device which freely permits angular motion at all times.

A known disadvantage with such a system is that there is a significant difficulty in attaining an adequate mechanical strength to the locking mechanism for the hinge device. For instance, the seat back may be pushed forward by an object in the rear compartment when the vehicle sharply decelerates due to an abrupt braking or a crash. Because the seat back is restrained only on one side, the seat back may produce a tendency to twist. and the seat back. as well as the locking mechanism, is required to have an adequate mechanical strength and structural rigidity to withstand such a force. In case of a vehicle seat in which the upper end of the shoulder belt is attached to the seat back, the tension in the belt may apply a significant forward force to the seat back in a high deceleration situation. Similarly, when the vehicle is hit by another vehicle from the rear, the inertia of the vehicle occupant will apply a significant rearward force to the seat back.

For the locking mechanism for the seat hinge device to be capable of withstanding such a force, the locking mechanism is required to be made of relatively bulky and massive components, and this creates serious layout problems in addition to aesthetic problems. It is conceivable to provide a hinge device equipped with a locking mechanism on each side of the vehicle seat to ensure a sufficient mechanical strength. However, this requires a rod extending between the two hinge devices to synchronized the locking action of the two hinge devices, and this takes up a significant space under the seat. It is also conceivable to synchronize the locking action of two hinge devices by using a cable mechanism or other flexible force transmitting media as an alternative measure, but it would complicate the system, and increase the cost.

BRIEF SUMMARY OF THE INVENTION

In view of such problems of the prior art, a primary object of the present invention is to provide an emergency locking seat hinge device which allows free angular motion of the scat back under normal conditions, but can fixedly secure the angular position of the seat back at any desired angular position in a continuous manner in high deceleration or acceleration situations.

A second object of the present invention is to provide an emergency locking seat hinge device which is simple in structure, and economical to fabricate.

A third object of the present invention is to provide an emergency locking seat hinge device which is highly compact.

A fourth object of the present invention is to provide an emergency locking seat hinge device which can maintain the angular position of the seat back even when subjected to a relatively large force.

According to the present invention, these and other objects can be accomplished by providing an emergency locking seat hinge device, comprising: a seat bottom bracket adapted to be attached to a seat bottom and defining an annular recess therein; a seat back bracket adapted to be attached to a seat back. and pivotally attached to the scat bottom bracket about an axial center of the annular recess; an inner cam member integrally attached to the seat back bracket and received in the annular recess so as to jointly define a plurality of chambers each having a relatively wide central part and end parts which get progressively narrower circumferentially away from the central part, a plurality of rolling members each received in a corresponding one of the chambers, each rolling member being dimensioned so as to be narrower than the central part but wider than the end parts; a disk member which is pivotally and coaxially supported by the seat back bracket and provided with a plurality of projections for engaging each of the rolling members; spring members provided between the disk member and the inner cam member for producing a circumferential centering spring force therebetween which resiliently retains the rolling members in the wide central parts via the projections of the disk member; and an acceleration sensitive locking device which engages the disk member with respect to the seat bottom bracket upon detection of an acceleration or deceleration exceeding a prescribed level.

Thus, upon detection of an acceleration or decelration exceeding a prescribed level, a relative angular displacement is produced between the disk member and the inner cam member. As a result, the rolling members arc displaced from the wide central parts toward the narrower ends parts. Therefore, when a relative rotation occurs between the seat back bracket and the seat bottom bracket as a result of the acceleration or deceleration, the rolling members are wedged between these two members, and prevent the relative rotation between the seat bottom bracket and the seat back bracket. This locking action can take place at any desired angular position as opposed to the locking action of a ratchet device which can prevent relatively rotation only at prescribed discrete angular positions Therefore, it is particularly advantageous to provide the scat hinge device only on one side of the seat while a recliner hinge device is provided on the opposite side of the scat. Thus, the hinge device does not interfere with the normal adjustment of the seat back by the recliner hinge device, but in a high acceleration situation such as a vehicle crash, the hinge device of the present invention opposes the angular motion of the seat back in cooperation with the recliner device at a high mechanical strength without causing any significant deformation to the seat back. The present invention is equally applicable to a foldable seat which has a seat back adapted to be folded forward to permit access to the rear compartment of the vehicle. In this case, a hinge device with a latch is provided on one side of the scat while the hinge device of the present invention is provided on the other side of the scat.

Also, the hinge device of the present invention can prevent the relative rotation of either direction between the seat back and the seat bottom.

According to a preferred embodiment of the present invention, the acceleration sensitive locking device comprises at least one ratchet wheel provided in the disk member, a pawl member moveably supported by the seat bottom bracket so as to selectively engage the ratchet wheel, and an inertia mass member resiliently supported by the seat bottom bracket and adapted to drive the pawl member into engagement with the ratchet wheel when subjected to an acclamation or declaration exceeding a prescribed level. The inertia mass member can be resiliently supported in a number of different ways which arc all well known in the art. For instance, a metallic ball may be placed in a bottom of a valley so that the motion of the metallic ball moving up the slope in a high acceleration or deceleration situation may be used for activating the pawl member, with the gravitational force providing the resilient force for maintaining the metallic ball at the rest position. Also, a pendulum or a mass supported by a spring member may also be used instead of the metallic ball.

Likewise, the spring members provided between the disk member and the inner cam member for producing a circumferential centering spring force therebetween may take a number of different forms without departing from the spirit of the present invention. According to a preferred embodiment of the present invention, the disk member is provided with an arcuate slot, and the inner cam member is provided with an axial projection received in the arcuate slot, the spring members including a pair of compression coil springs each interposed between the axial projection and a corresponding one of the circumferential ends of the arcuate slot.

It is important that the inner cam member is securely attached to the seat back bracket without interfering with the pivotal connection between the seat back bracket and the seat bottom bracket. According to the preferred embodiment of the present invention, the scat back bracket is provided with an opening surrounded by a collar which is fitted into an opening defined in the scat bottom bracket coaxially with respect to the annular recess so as to pivotally support the seat back bracket with the seat bottom bracket. Further, the opening in the seat back bracket is provided with an inner circumferential profile in the shape of an internal gear, and the inner cam member is also provided with a central opening having an identical inner circumferential profile, a gear member having a corresponding outer profile being fitted into the openings of the seat back bracket and the inner cam member with an annular shoulder defined by the annular recess of the scat bottom bracket interposed between the inner cam member and the seat back bracket.

According to a particularly preferred embodiment of the present invention, the collar of the seat back bracket is provided with an outer circumferential profile in the shape of an external gear, and the inner cam member is provided with a plurality of axial projections arranged along a common coaxial circle which fit into gaps defined between the inner circumferential surface of the opening of the seat bottom bracket and the outer profile of the collar of the seat back bracket.

A flanged sleeve member may be passed through a central opening of the gear member, and the central bore of the disk member so that the entire assembly of the hinge device. more particularly the seat bottom bracket can be securely attached to a seat frame by passing a threaded bolt though the inner bore of the sleeve.

Once the rolling members are wedged between the inner cam member and the seat bottom bracket, the presence of the projections for retaining the rolling members in the center of the chambers is no longer necessary. Therefore, the projections of the disk member for engaging the rolling members may be adapted to be destroyed when the disk member is engaged by the acceleration sensitive locking device, and the rolling members are wedged into the narrow end parts of chambers.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
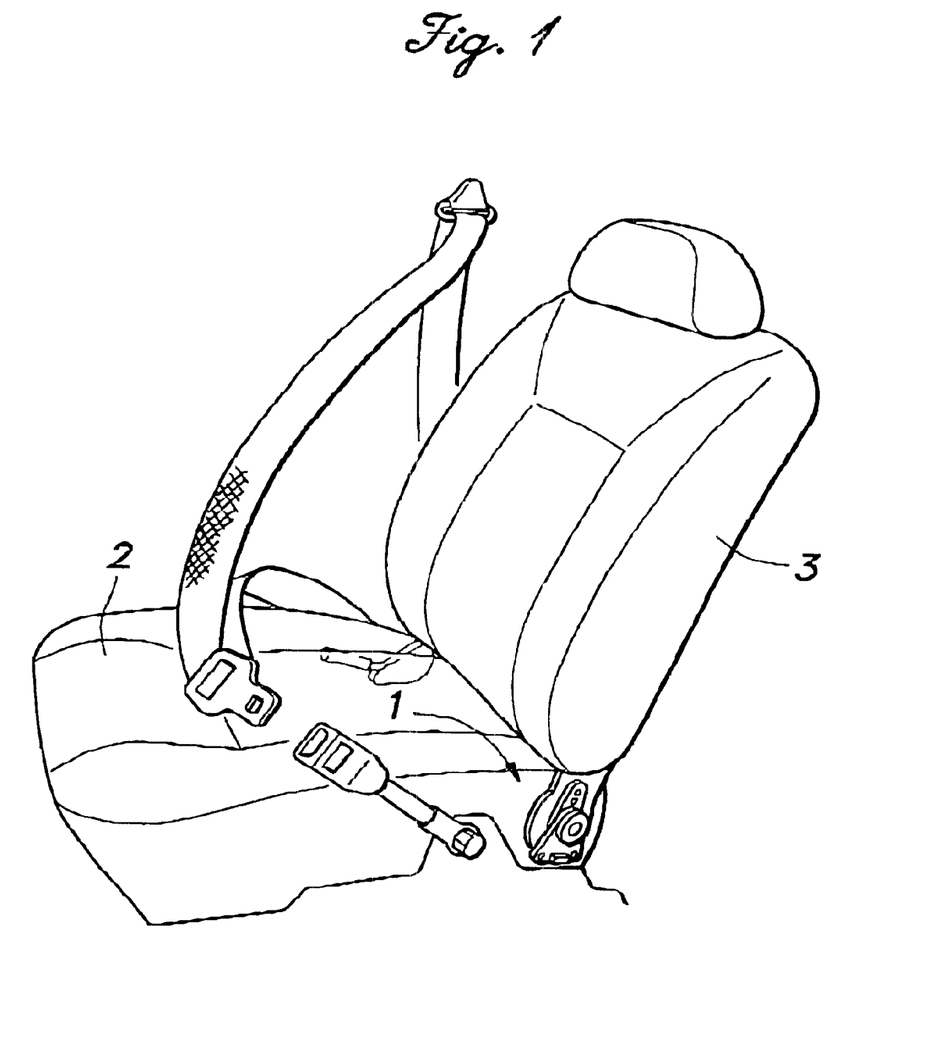
FIG. 1 is a front view of a vehicle seat incorporated with a seat hinge device embodying the present invention.

FIG. 1 shows an automotive seat including a seat bottom 2 and a scat back 3 which are pivotally joined by a hinge device 1 embodying the present invention. In the embodiment illustrated in FIG. 1, the hinge device 1 of the present invention is provided only on one side of the seat, and the hinge device provided on the other side of the vehicle seat may consist of any known recliner hinge device which permits angular adjustment of the seat back either manually or by a powered motor. This other hinge device may also consist of one which can selectively allow the seat back to be folded forward to permit access to the rear compartment of the vehicle. This seat is additionally provided with a seat belt which is conventional and is not a part of the present invention.

Referring to FIGS. 2 to 6, the hinge device 1 comprises a seat bottom bracket 4 which is to be attached to the seat bottom 2, and a seat back bracket 5 which is to be attached to the seat back 3. The seat back bracket 5 is provided with an opening 6 having the shape of an internal gear and surrounded by a collar 7 which has an inner circumference conforming to the opening 6 and an outer circumference having the shape of an external gear. A small central gear 8 fitted onto a flanged sleeve 9 is fitted into the opening 6 of the seat back bracket 5. The two brackets 4 and 5 are placed one next to the other with the collar 7 passed into an opening 10 of the seat bottom bracket 4. The side of the seat bottom bracket 4 facing away from the seat back bracket 5 is provided with an annular recess 11 surrounding the opening 10.

Figure 2:
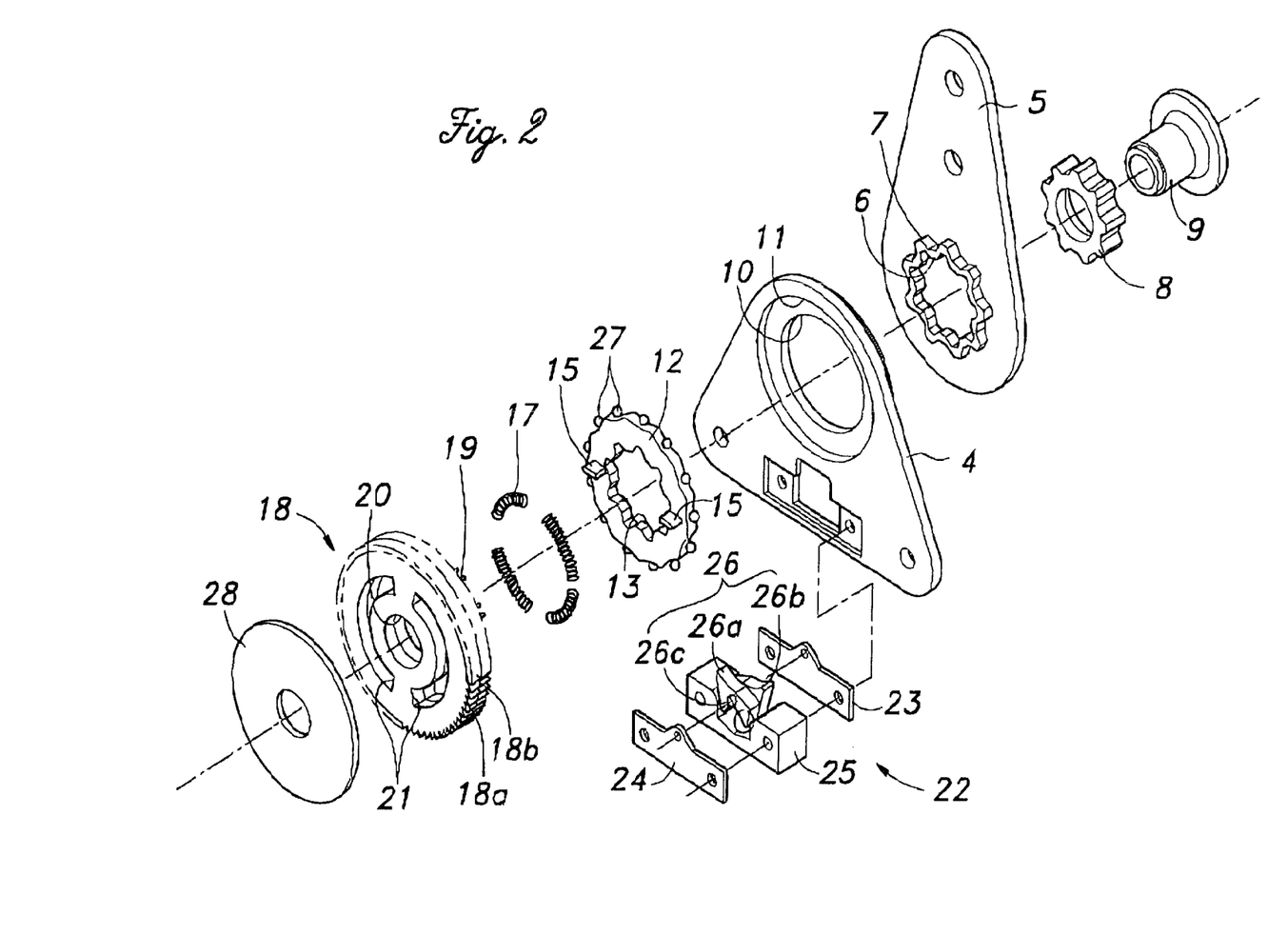
FIG. 2 is an exploded perspective view of the seat hinge device.
Figure 3:
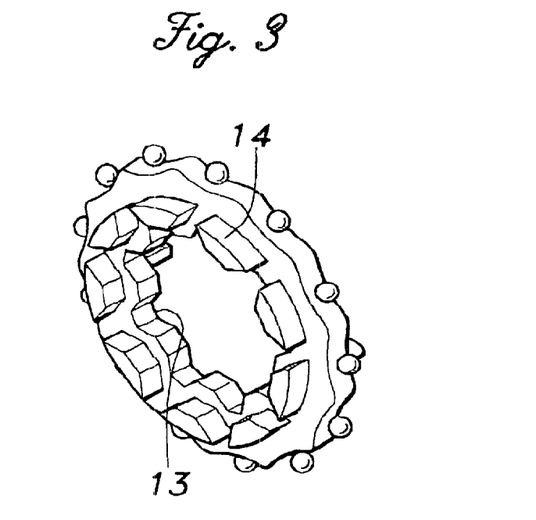
FIG. 3 is a perspective view showing the reverse side of the inner cam member.

An inner cam member 12 having an polygonal outer profile and a central opening 13 conforming to the outer profile of the central gear 8 is received in the annular recess 11 with The gear 8 passed into the central opening 13 of the inner can member 12. The side of the inner cam member 12 facing the seat back bracket 5 is provided with a plurality of projections 14 which fit into recesses defined by the valleys of the outer profile of the collar 7 in cooperation with the inner circumferential surface of the opening 10 of the seat bottom bracket 4. The inner cam member 12 is provided with a pair of projections 15 which are 180 degrees apart on the side facing away from the seat back bracket 5.

Figure 4:
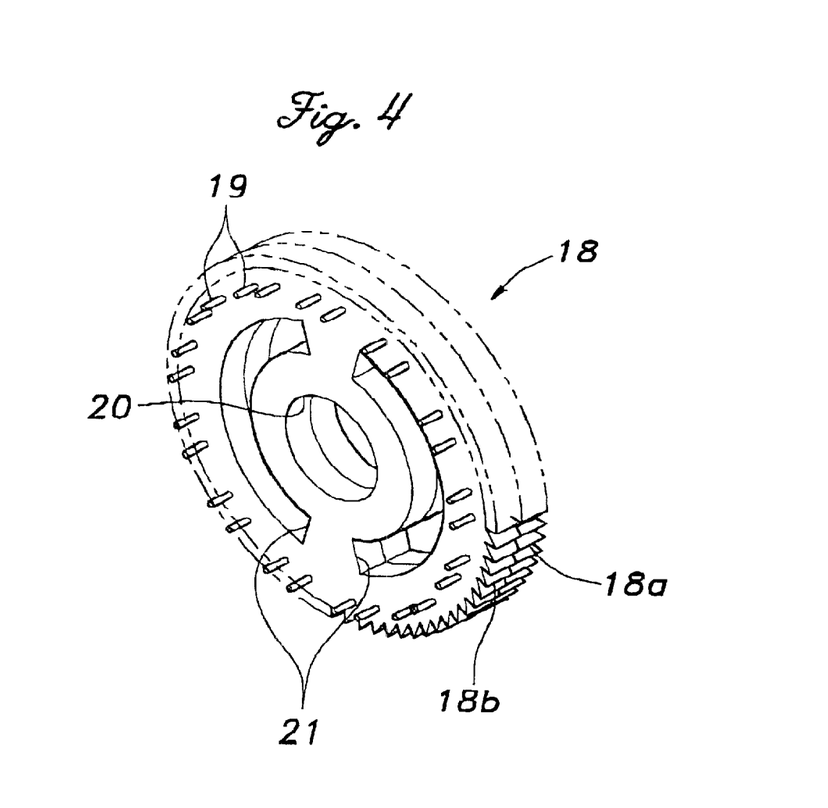
FIG 4.is a perspective view showing the reverse side of the disk member.

The seat hinge device 1 further includes a disk member 18 which has a central bore 20 adapted to be fitted on the sleeve 9 As best illustrated in FIG. 4, the disk member 18 additionally comprises a pair of ratchet wheels 18*a* and 18*b* having mutually opposite teeth orientations and integrally and coaxially joined together one next to the other, a plurality of pairs of pins 19 projecting axially from the side of the disk member 18 facing the seat back bracket 5 along a concentric circle, and a pair of arcuate slots 21 defined symmetrically and along a concentric circle.

Figure 5:
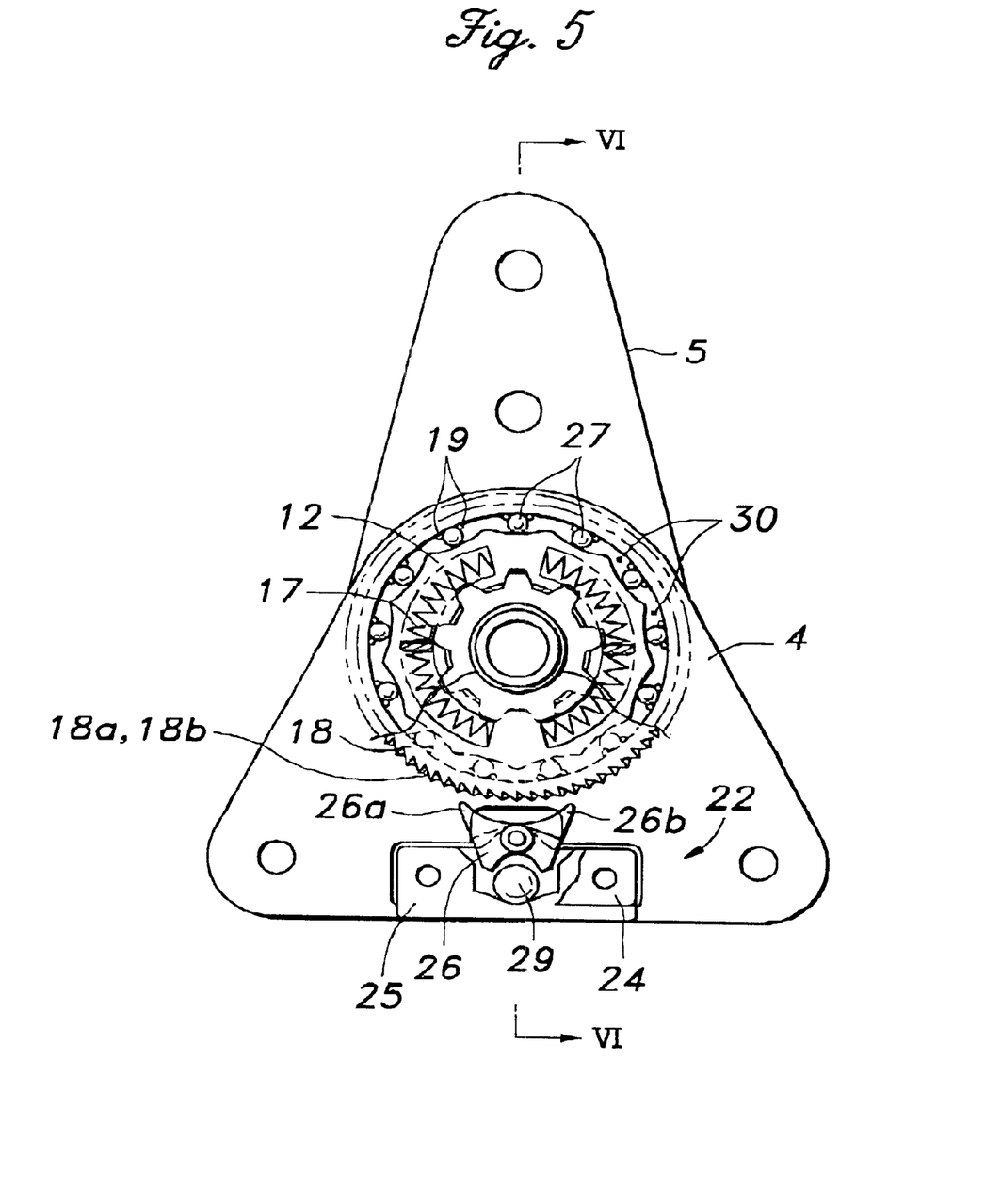
FIG. 5 is a partly broken away side view of the seat hinge device.
Figure 6:
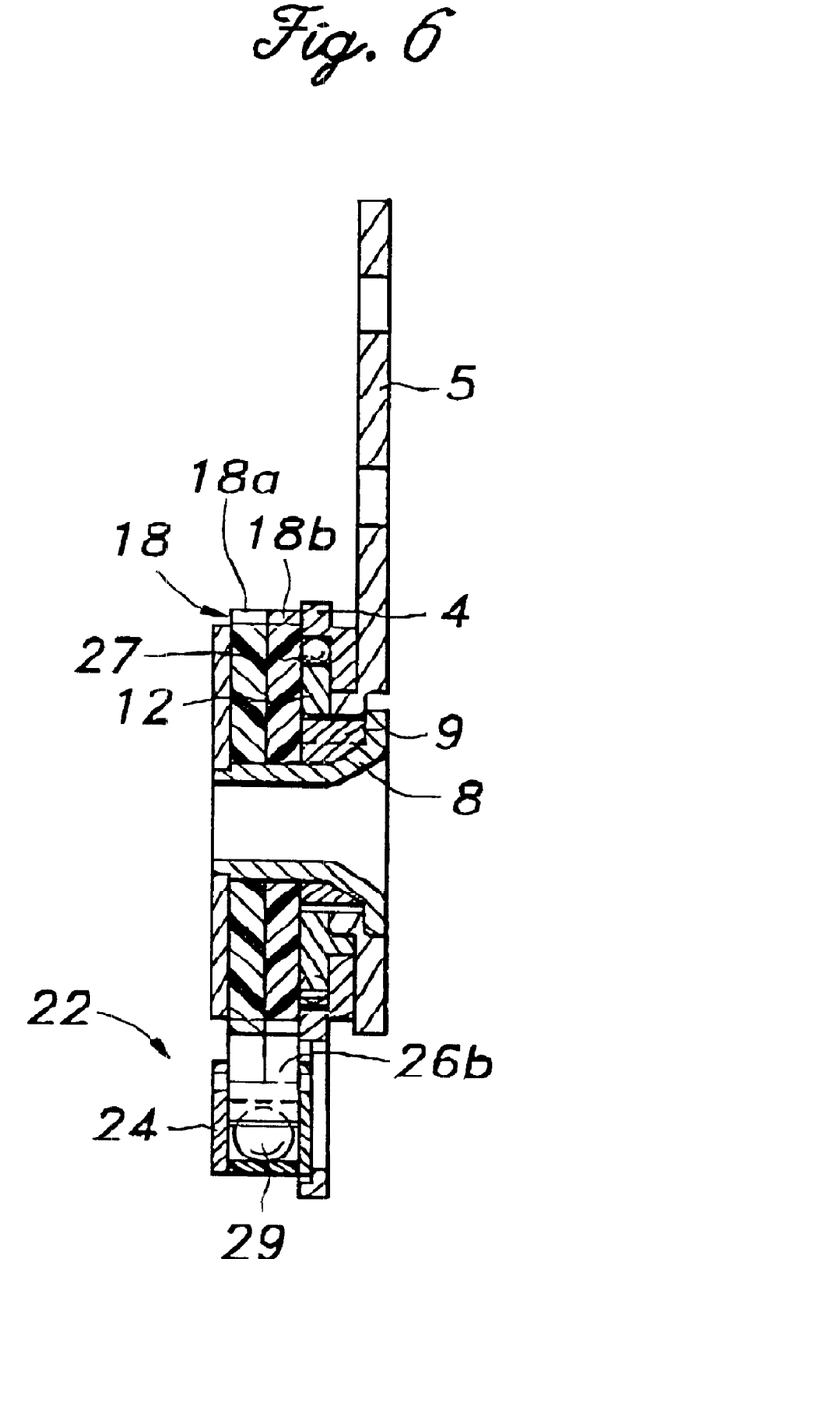
FIG. 6 is a sectional view taken along line VI—VI of FIG. 5.

The pair of projections 15 of the inner cam member 12 are each received in a central part of the corresponding arcuate slot 21, and a pair of compression coil springs 17 are interposed, under a pre-stressed condition, each between the corresponding projection 15 and a corresponding one of the opposing ends of the arcuate slot 21. The polygonal outer profile of the inner cam member 12 defines a plurality of chambers 30 in cooperation with the inner circumferential surface of the annular recess 11 of the seat bottom bracket 4. These chambers 30 are each provided with a retatively wide central part and two ends which get proressively narrower away from the central part. Each chamber 30 receives a steel ball 27 whose outer diameter is substantially smaller than the width of the central part of the chamber 30 but larger than the width of the extreme circumferential ends of the chamber 30. Each pair of the pins 19 of the disk member 18 hold a corresponding one of the steel balls 27 between them, and retain the ball 27 in the central part of the chamber 30 under a rest condition. A cover plate 28 is placed on the side of the disk member 20 so as to close the arcuate slots 21 from the side facing away from the seat back bracket 5, and the free end of the sleeve 9 is passed into a central opening of the cover plate 28 and crimped thereto A ratchet pawl assembly 22 is attached to a lower part of the seat bottom bracket 4. The ratchet pawl assembly 22 includes an inner bracket 23, a block member 25 defining a valley-shaped floor in a middle part thereof, and an outer bracket 24 which are jointly attached to the seat bottom bracket 4 by threaded bolts passed through these components and threaded into the threaded mounting holes provided in the scat bottom bracket 4. The ratchet pawl assembly 22 further includes a pawl member 26 integrally combining a pair of pawls 26*a* and 26*b* which are adapted to engage the corresponding ratchet wheels 18*a* and 18*b*, respectively, and pivotally supported by the inner and outer brackets 23 and 24. A steel ball 29 rests on the valley-shaped floor of the block member 25, and a pair of projections 26*c* integrally depend from the pawl member 26 and oppose the steel ball from the front and rear thereof, respectively.

The mode of operation of this seat hinge device is described in the following.

When no substantial acceleration is acting on this seat hinge device, the pawls 26*a* and 26*b* are kept disengaged from the corresponding ratchet wheels 18*a* and 18*b*, and the disk member 18 is held in the neutral position deemed by the balancing or the two compression coil springs 17 in each of the arcuate slots 21. Therefore, the small steels balls 27 are each held in the widest part of the corresponding chambers 30 by the corresponding pairs of the pins 19, and the seat back bracket 5, hence the seat back 2. can frilly rotate relative to the scat bottom bracket 4.

Figure 7:
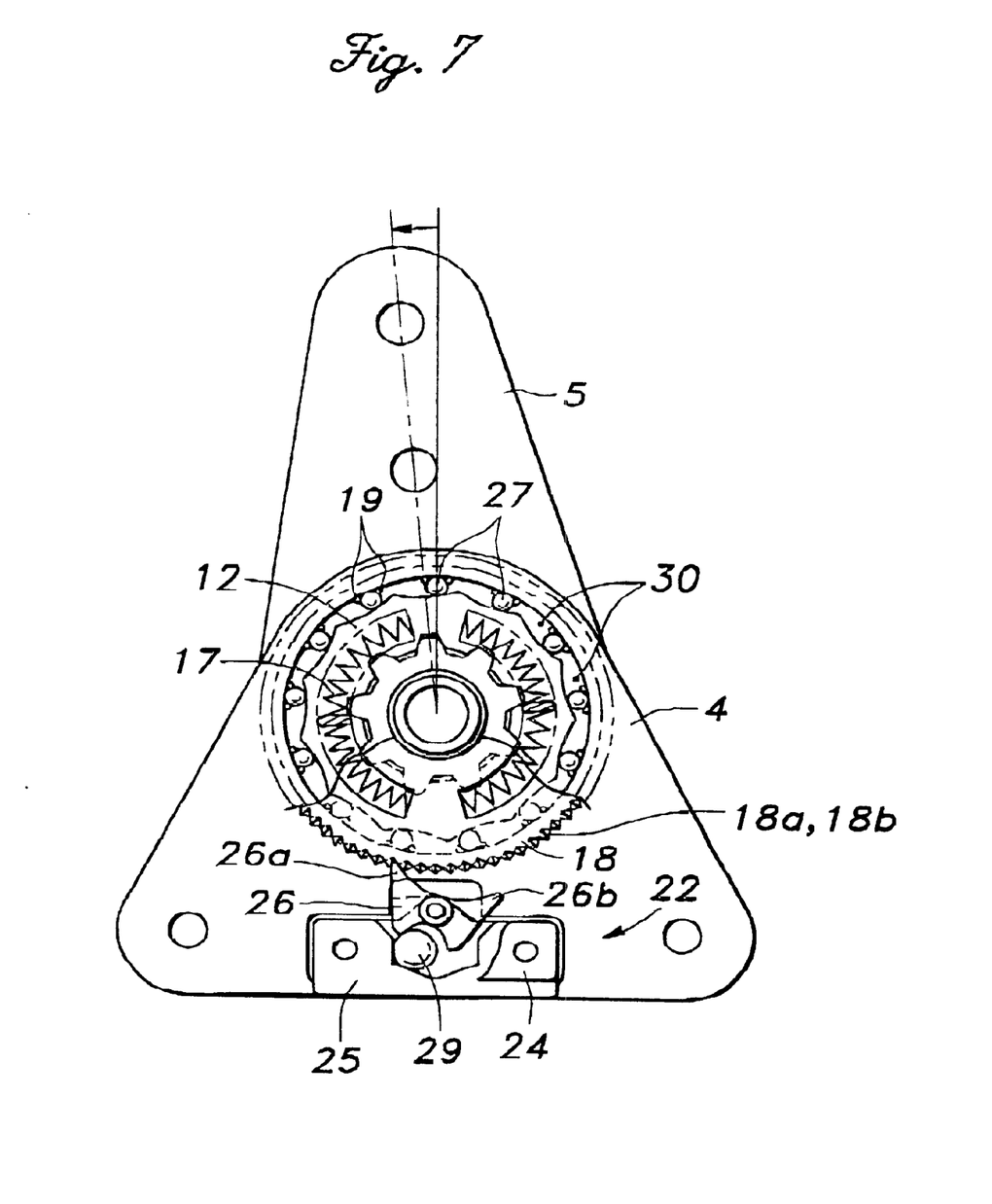
FIG. 7 is a view similar to FIG. 5 showing a case where the vehicle is subjected to a forward acceleration and the hinge device opposes the rearward tilting of seat back.

When an acceleration exceeding a prescribed level is applied to the seat hinge device as would happen in a vehicle crash situation, the ratchet pawl member 26 tilts in either direction with the steel ball 29 acting on one of the projections 26*c* of the ratchet pawl member 26 under an inertia force, and engages the corresponding ratchet wheel 18*a* or 18*b*. Suppose that the vehicle has experienced a forward acceleration, and the ratchet pawl has engaged one of the ratchet wheels so as to prevent the rotation of the disk member 18 in the direction corresponding to the rearward tilting of the seat back as illustrated in FIG. 7. When the seat back is pushed backward under this condition, the inner cam member 12 turns integrally with the seat back bracket 5 while the disk member 18 remains stationary. As a result, the small steel balls 27 which are held stationary by the paired pins 19 of the disk member 18, in appearance, move toward the narrower ends of the corresponding chambers 30 due to the movement of the inner cam member 12 defining the chambers 30 relative to the small steel balls 27. This causes an engagement between the inner cam member 12 which is integral with the seat back bracket 5 and the scat bottom bracket 4.

Figure 8:
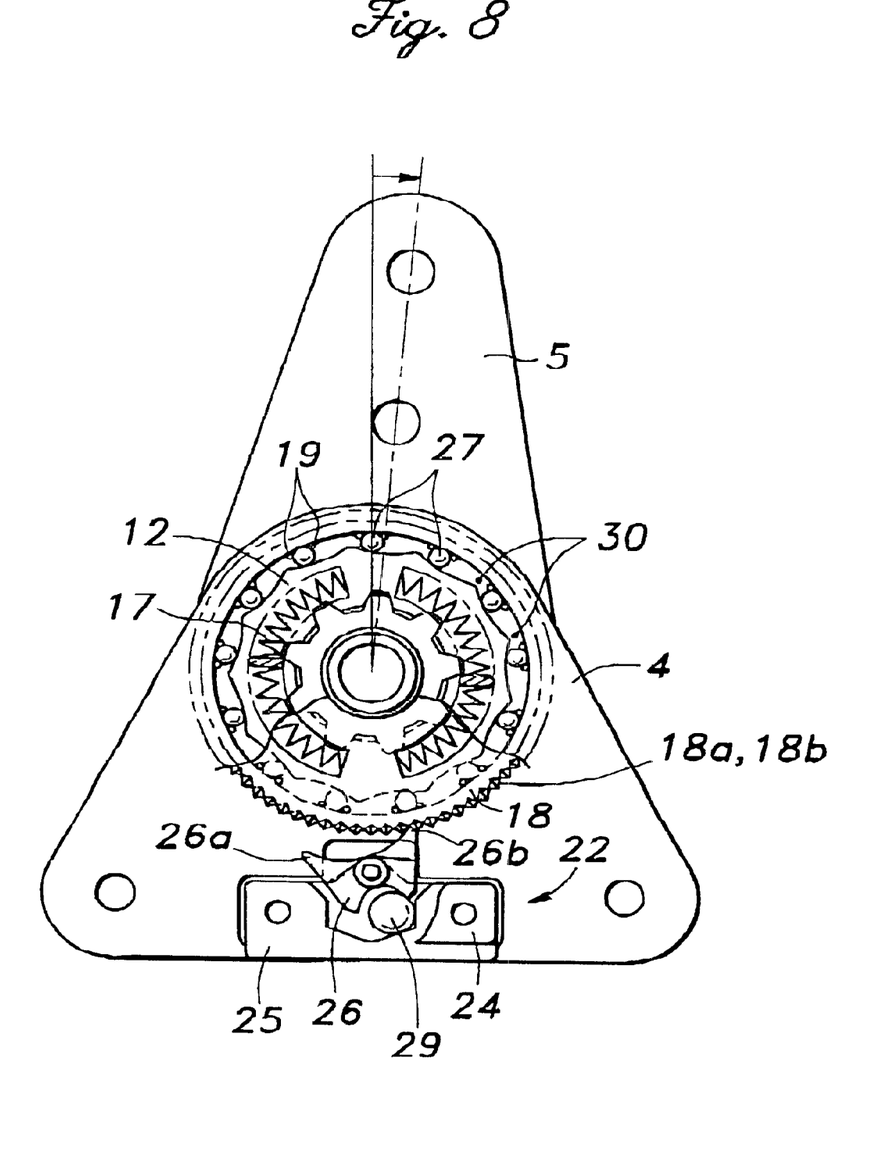
FIG. 8 is a view similar to FIG. 5 showing a case where the vehicle is subjected to a deceleration and the hinge device opposes the forward tilting of the seat back and FIG. 9 is a view similar to FIG. 5 showing a second embodiment of the present invention.

When the vehicle experiences a deceleration or an acceleration in the opposite direction, the disk member 18 is prevented from rotating in the opposite direction as illustrated in FIG. 8 so that the forward tilting of the scat back causes the steel balls 27 to be moved toward the opposite narrower ends of the corresponding chambers. This again causes an engagement between the inner cam member 12 which is integral with the seat back bracket 5 and the seat bottom bracket 4.

In either case, as the level of the acceleration or deceleration which the vehicle experiences increases further, the pins 19 retaining the small steel balls 27 are eventually broken, and the small steel balls 27 which are subjected to an increasing wedging force are forced into the material of the inner cam member 12 and/or the scat bottom bracket 4. This plastic deformation of the material is highly effective in absorbing the energy of the impact, and reduces the acceleration or deceleration which the seat back or the vehicle occupant experiences.

Figure 9:
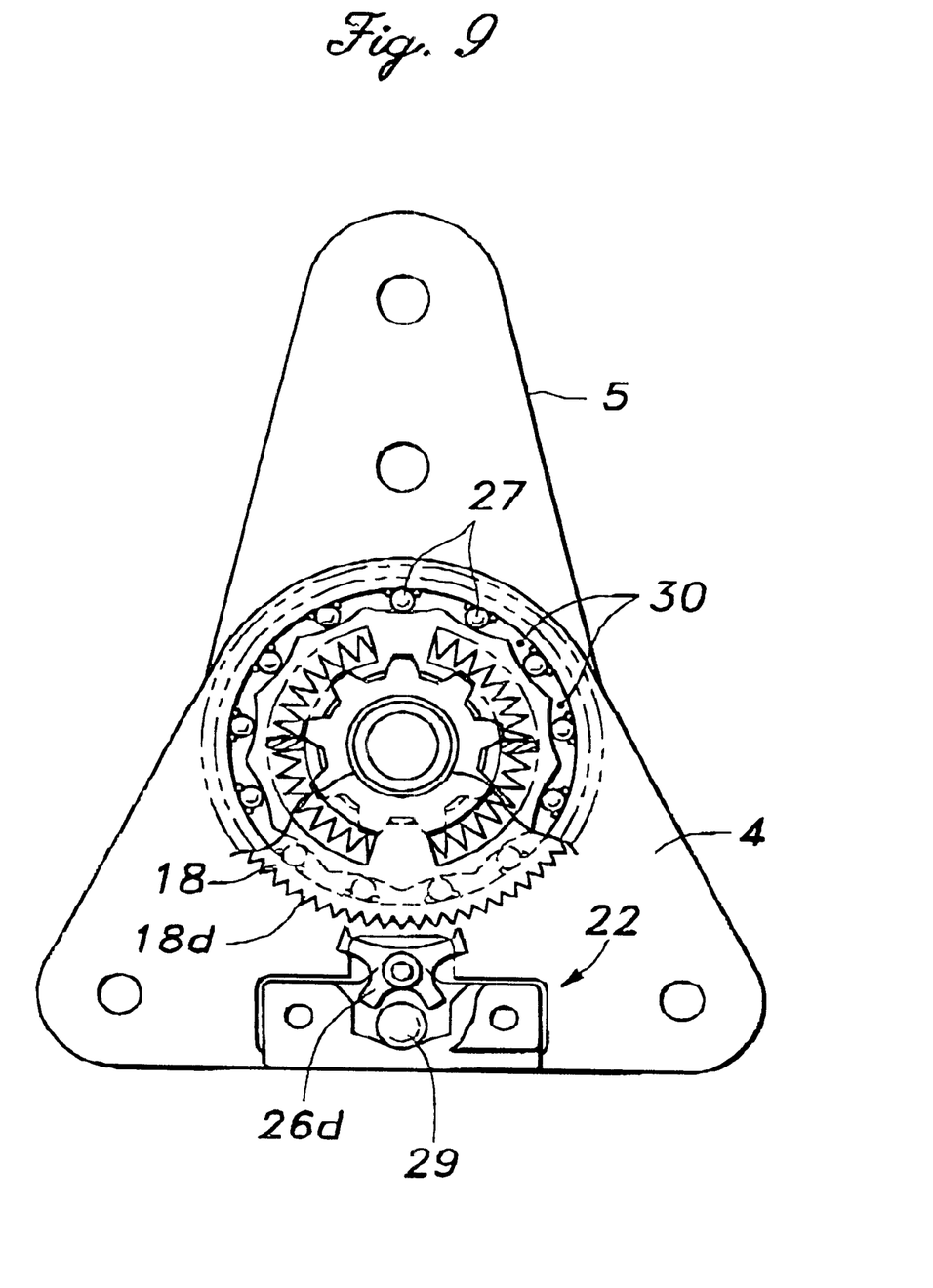

FIG. 9 shows a second embodiment to the present invention, and the parts corresponding to those of the previous embodiments are denoted with like numerals. In this embodiment, the disk member 18 is provided with a single escapement wheel 18*d*. instead of the two ratchet wheels of the previous embodiment, and the pawl assembly 22 includes a single pawl 26*d* which is adapted to engage the escapement wheel 18*d* against rotation of either direction depending on the direction of engagement of the pawl 26*d*. This embodiment allows the thickness of the disk member to be reduced, and contributes to the compact design of the seat hinge device.

Typically, the emergency locking seat hinge devices described above can be installed on one side of a vehicle scat while a normal recliner hinge device is provided on the other side of the vehicle seat. However, it is also possible to provide the emergency locking hinge device on one side of a vehicle seat, and a combination of a normal recliner hinge device and an emergency locking hinge device on the other side of the vehicle seat, to maximize the mechanical strength of the seat back against a forward and/or rearward force applied thereto.

Although the present invention has been described in terms of preferred embodiments thereof, it is obvious to a person skilled in the art that various alterations and modifications are possible without departing from the scope of the present invention which is set forth in the appended claims.

What is claimed is:

1. An emergency locking seat hinge device, comprising:
   a seat bottom bracket adapted to be attached to a seat bottom and defining an annular recess therein;
   a seat back bracket adapted to be attached to a seat back and pivotally attached to said seat bottom bracket about an axial center of said annular recess;
   an inner cam member integrally attached to said seat back bracket and received in said annular recess so as to jointly define a plurality of chambers each having a relatively wide central part and end parts which get progressively narrower circumferentially away from said central part;
   a plurality of rolling members each received in a corresponding one of said chambers, each rolling member being dimensioned so as to be narrower than said central part but wider than said end parts;
   a disk member which is pivotally and coaxially supported by said seat back bracket and provided with a plurality of projections for engaging each of said rolling members;
   spring members provided between said disk member and said inner cam member for producing a circumferential centering spring force therebetween which resiliently retains said rolling members in said wide central parts via said projections of said disk member; and
   an acceleration sensitive locking device which engages said disk member with respect to said seat bottom bracket upon detection of an acceleration or deceleration exceeding a prescribed level.

2. An emergency locking seat hinge device according to claim 1, wherein said acceleration sensitive locking device comprises at least one ratchet wheel provided in said disk member, a pawl member moveably supported by said seat bottom bracket so as to selectively engage said ratchet wheel, and an inertia mass member resiliently supported by ,aid seat bottom bracket and adapted to drive said pawl member into engagement with said ratchet wheel when subjected to an acceleration or declaration exceeding a prescribed level.

3. An emergency locking seat hinge device according to claim 2, wherein said disk member is provided with an arcuate slot having opposed circumferential ends, and the inner cam member is provided with an axial projection received in said arcuate slot, said spring members including a pair of compression coil springs each interposed between said axial projection and a corresponding one of said circumferential ends of said arcuate slot.

4. An emergency locking seat hinge device according to claim 2, wherein said disk member is provided with a pair of ratchet wheels having opposite teeth orientations, and said acceleration sensitive locking device comprises a pair of pawls which are catch adapted to engage a corresponding one of said ratchet wheels depending on a direction of the acceleration exceeding the prescribed level detected by said acceleration sensitive locking device.

5. An emergency locking seat hinge device according to claim 2, wherein said disk member is provided with a single ratchet wheel consisting of an escapement wheel, and said pawl member is adapted to prevent rotation of said escapement wheel in either direction upon activation thereof depending on a direction of the acceleration exceeding the prescribed level detected by said acceleration sensitive locking device.

6. A vehicle seat incorporated with an emergency locking seat hinge device according to claim 1, wherein said seat hinge device is provided only on one side of the seat while a recliner hinge device is provided on the opposite side of the seat.

7. A vehicle seat incorporated with an emergency locking seat hinge device according to claim 1, wherein said seat hinge device is provided only on one side of the seat while a folding hinge device is provided on the opposite side of the seat.

8. An emergency locking seat hinge device according to claim 1, wherein said projections of said disk member for engaging said rolling members are adapted to be destroyed when said disk member is engaged by said acceleration sensitive locking device, and said rolling members are wedged into said narrow end parts of chambers.

9. An emergency locking seat hinge device according to claim 1, wherein said seat back bracket is provided with an opening surrounded by a collar which is fitted into an opening defined in said seat bottom bracket coaxially with respect to said annular recess so as to pivotally support said seat back bracket with said seat bottom bracket.

10. An emergency locking seat hinge device according to claim 9, wherein said opening in said seat back bracket is provided with an inner circumferential profile in the shape of an internal gear, and said inner cam member is also provided with a central opening having an identical inner circumferential profile, a gear member having a corresponding outer profile being fitted into said openings of said seat back bracket and said inner cam member with an annular shoulder defined by said annular recess of said seat bottom bracket interposed between said inner cam member and said seat back bracket.

11. An emergency locking seat hinge device according to claim 10, wherein said disk member is provided with a central bore, and further comprising a flanged sleeve member which is passed through a central opening of said gear member, and said central bore of said disk member.

12. An emergency locking seat hinge device according to claim 10, wherein said collar of said seat back bracket is provided with an outer circumferential profile in the shape of an external gear, and said inner cam member is provided with a plurality of axial projections arranged along a common coaxial circle which fit into gaps defined between the inner circumferential surface of said opening of said seat bottom bracket and said outer profile of said collar of said seat back bracket.

13. A seat hinge device, comprising:
   an outer member defining an annular recess around an axial center;
   an inner member including an inner cam member received in said annular recess so as to define a plurality of chambers each having a relatively wide central part and end parts which get progressively narrower circumferentially away from said central part;

a plurality of rolling members each received in a corresponding one of said chambers, each rolling member being dimensioned so as to be narrower than said central part but wider than said end parts;

a retaining member which is moveably supported by one of said outer and inner members to retain each rolling member at a position in a corresponding one of said chambers;

a spring member interposed between said retaining member and said one of said outer and inner members to resiliently retain each of said rolling members at said wide central part of the corresponding chamber; and an actuation member for selectively engaging said retaining member with the other of said inner and outer members so as to cause a relative movement between said retaining member and said one of said outer and inner members and cause each of said rolling members to wedge between said inner and outer members.

14. A seat hinge device according to claim 13, further comprising an acceleration sensitive locking device which includes an inertia mass member adapted to actuate said actuation member when subjected to an acceleration or declaration exceeding a prescribed level.

* * * * *